US005369863A

United States Patent [19]

Hasenberg et al.

[11] Patent Number: 5,369,863

[45] Date of Patent: Dec. 6, 1994

[54] BICYCLE CRANK ARM PULLER

[75] Inventors: Mark J. Hasenberg; Steven R. Wente, both of Kenosha, Wis.

[73] Assignee: Snap-on Incorporated, Kenosha, Wis.

[21] Appl. No.: 137,403

[22] Filed: Oct. 18, 1993

[51] Int. Cl.[5] .............................. B23P 19/04

[52] U.S. Cl. .............................. 29/264

[58] Field of Search .............................. 29/263, 264, 258; 411/435, 409, 377, 429, 431, 908

[56] References Cited

U.S. PATENT DOCUMENTS

| | | | |
|---|---|---|---|
| 1,468,334 | 2/1921 | Thomason . | |
| 1,505,232 | 8/1924 | Trautner . | |
| 1,782,303 | 11/1930 | Imlach | 29/264 |
| 2,467,982 | 4/1949 | Manis | 29/263 |
| 4,207,664 | 6/1980 | Zoula . | |
| 4,551,898 | 11/1985 | Provost | 29/263 |
| 4,694,569 | 9/1987 | Colvell et al. . | |
| 5,054,163 | 10/1991 | Sterling et al. | 411/435 |
| 5,099,726 | 3/1993 | Hsiao . | |

OTHER PUBLICATIONS

Photographs of Park Tools part No. CCP-1.
Photographs of Campagnolo crank arm puller tool.

*Primary Examiner*—Robert C. Watson
*Attorney, Agent, or Firm*—Emrich & Dithmar

[57] ABSTRACT

A bicycle crank arm puller includes a tubular insert externally threaded for threaded engagement in an internally threaded portion of a bore in a crank arm, the other portion of the bore receiving an axle end in press-fitted engagement. The insert has an enlarged, radially outwardly extending, trilobular handle. A drive screw is threadedly engaged through the tubular insert and has a part-spherical bearing end engageable with the axle end. A square drive socket on the outer end of the drive screw receives the drive lug of an associated lever member.

8 Claims, 2 Drawing Sheets

20
21
22
23
27
28
30
31
32
33
34
35
40
41
43
44
45
46
50
51
53
55
56
60
61
62
65
66
70
71
72
73

BICYCLE CRANK ARM PULLER

BACKGROUND OF THE INVENTION

1. Field of the Invention

This invention relates to hand tools and, more particularly, to tools for removing bicycle crank arms from the ends of axles.

2. Description of the Prior Art

Bicycle crank arms are typically provided with a compound bore through one end thereof, the inner portion of the bore being substantially square in transverse cross section and the outer portion of the bore being internally threaded, the two portions being separated by a radially extending shoulder. The square portion of the bore is press-fitted over the square end of the axle. One type of axle has an internally threaded female end and another type has a male end with an externally threaded stud projecting therefrom. In the former type the crank arm is locked in place on the axle end by a retaining screw having a flange which bears against the shoulder in the crank arm bore. In the latter type a flanged retaining nut engages the axle end stud.

The crank arm is often difficult to remove from the axle end. Accordingly, puller tools have been provided to assist in removal of the crank arm from the axle end. Such tools typically include an externally threaded tubular insert which threadedly engages in the threaded portion of the crank arm bore after the retaining nut or screw has been removed. The puller also includes a pressure screw which is threadedly engaged through the tubular insert and has a bearing end which bears against the axle end so that, as the pressure screw is rotated, it cooperates with the insert to separate the crank arm from the axle end.

The insert is typically provided with a hex portion which is engageable with an associated hex wrench or the like to facilitate engagement thereof in the crank arm bore. Similarly, the pressure screw may be provided with a polygonal end for engagement by another wrench. This commonly requires the use of two different wrenches.

One type of prior tool, disclosed in U.S. Pat. No. 5,099,726, provides a hex surface on one end of the insert and another hex surface intermediate the ends of the pressure screw and a handle member with a box-type hex wrench opening which can be used on the hex drive surfaces of either the insert or the drive screw. But this requires the use of a separate specialized wrench tool. That device also provides a hex socket on the outer end of the pressure screw which can be engaged with a standard hex drive tool for rotating the screw. Again, the device either requires a specialized wrench tool or two separate wrench-like tools.

Another type of tool manufactured by Park Tools under part no. CCP-1 has an integral handle permanently attached to the outer end of the drive screw and a hex surface on the insert for engagement by a standard hex wrench. However, this still requires a separate wrench to drive the insert and, furthermore, the drive screw handle is only about 6½ inches long and affords limited leverage. This may be insufficient, because often the torque required to remove the crank arm can approach 100 lb.-feet. Furthermore, the Park Tools device has a conical tip on the bearing end of the pressure screw which can damage the threads of a female axle end.

SUMMARY OF THE INVENTION

It is a general object of the invention to provide an improved crank arm pulling tool which avoids the disadvantages of prior tools while affording additional structural and operating advantages.

An important feature of the invention is the provision of an apparatus for removing a crank arm from an axle end which is of relatively simple and economical construction.

In connection with the foregoing feature, another feature of the invention is the provision of an apparatus of the type set forth which works equally well with both male and female axle ends without damage to the axle end.

A still further feature of the invention is the provision of an apparatus of the type set forth which does not require the use of a separate wrench to screw the insert into the crank arm bore.

Yet another feature of the invention is the provision of an apparatus of the type set forth which is self-centering on the axle end.

A still further feature of the invention is the provision of an apparatus of the type set forth which is adaptable for use with standard drive lever tools of any desired length.

These and other features of the invention are attained by providing apparatus for removing a pedal crank arm from a bicycle axle end, wherein the axle end is received in a bore in the crank arm, the apparatus comprising: a tubular insert receivable coaxially in the crank arm bore and adapted to be fixed to the crank arm, an enlarged handle member integral with the tubular insert intermediate the ends thereof and projecting radially outwardly therefrom to facilitate manual insertion of the tubular insert in the crank arm bore, and a pressure screw receivable coaxially through the insert in threaded engagement therewith, the screw having a bearing end engageable with the axle end.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
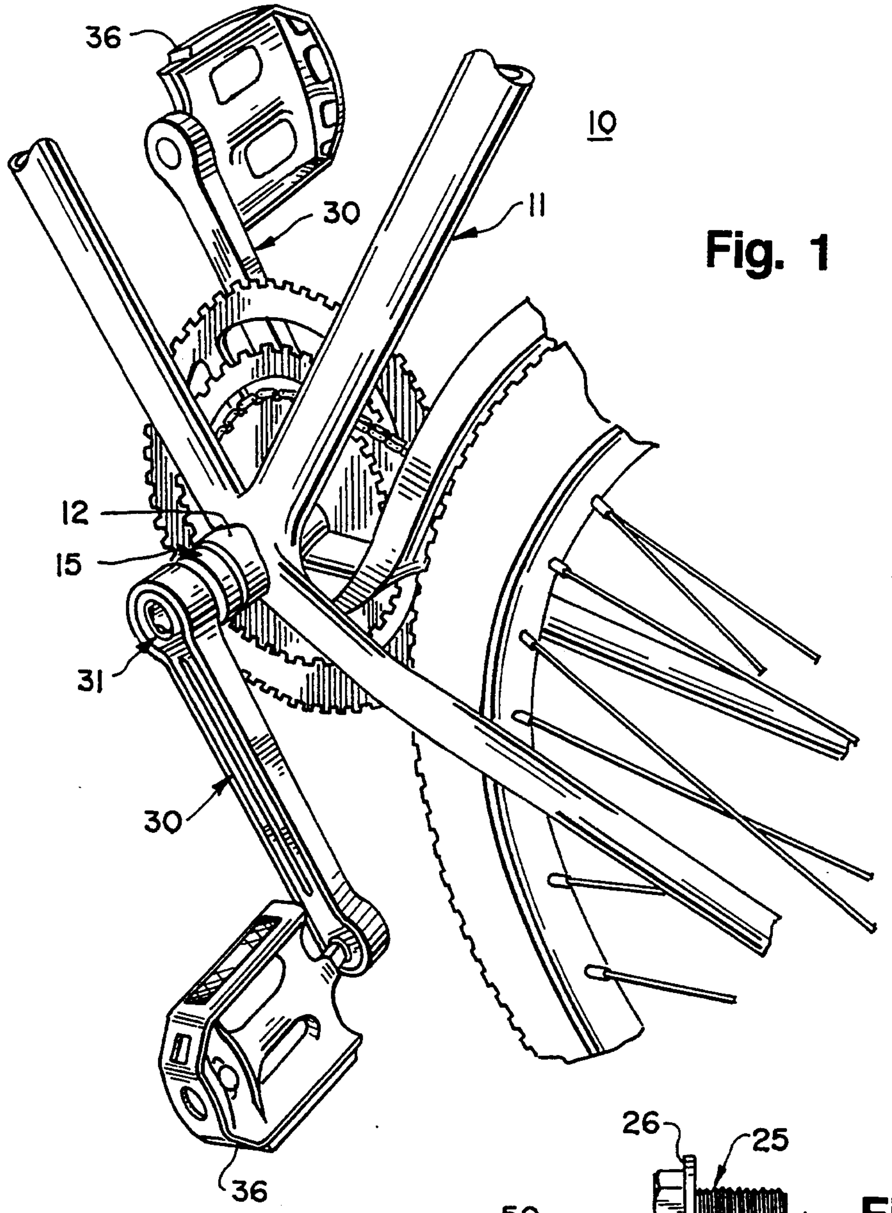
FIG. 1 is a fragmentary perspective view of a portion of a bicycle, including the bottom bracket with crank arms mounted on the ends of the axle.

Referring to FIG. 1, there is illustrated a bicycle 10 having a frame 11 with a bottom bracket 12. Mounted in the bottom bracket 12 is an axle 15 which has mounting ends 16 (one shown) which are substantially square in transverse cross section and respectively have internally threaded bores 17 formed axially therein (see FIG. 3). Referring to FIG. 4, it will be appreciated that the bicycle 10 could also be provided with an axle 20 which is similarly provided with square mounting ends 21. However, in the case of the axle 20, each mounting end 21 is provided with an axially outwardly extending externally threaded stud 22. It is a significant aspect of the present invention that it is useful with either the female type of axle 15 or the male type of axle 20. In either event, the axle is typically provided with suitable bearings 23 (FIG. 4) in a known manner. The female type axle 15 is also provided with retaining screws 25 (one shown in FIG. 3), which are respectively threadedly engageable in the internally threaded bores 17, the head of the screw 25 being provided with a radially outwardly extending annular flange 26. Similarly, the male type axle 20 is provided with nuts 27 (one shown in FIG. 4), respectively threadedly engageable with the studs 22, and each provided with a radially outwardly extending annular flange 28.

Referring to FIGS. 1–4, the bicycle is also provided with a pair of pedal crank arms 30, which are respectively mounted on the opposite ends of the axle 15 or 20. The crank arms 30 are substantially identical in construction. Each has enlarged part-cylindrical ends with one end having a bore 31 extending therethrough, the bore 31 having a square portion 32 shaped and dimensioned for mating engagement with the square mounting end 16 or 21 of the associated axle 15 or 20, and an internally threaded portion 33. A radially inwardly extending shoulder 34 joins the internally threaded portion 33 to the square portion 32. Formed through the opposite end of the crank arm 30 is an internally threaded pedal bore 35 which threadedly receives the stud end of an associated pedal 36 in a known manner.

Figure 2:
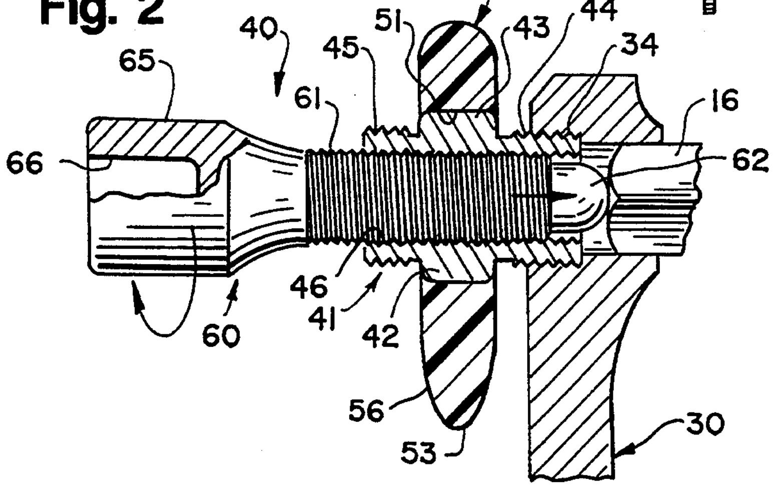
FIG. 2 is a fragmentary view in partial section of the connection between the crank arm and a female axle end and illustrating the use of a tool constructed in accordance with and embodying the features of the invention.
Figure 3:
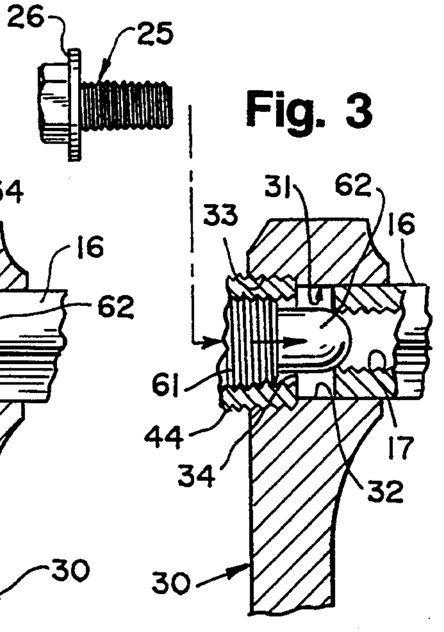
FIG. 3 is a fragmentary view similar to FIG. 2, illustrating the engagement of the tool with the female axle end, and illustrating the retaining screw in an exploded form.
Figures 4, 5:
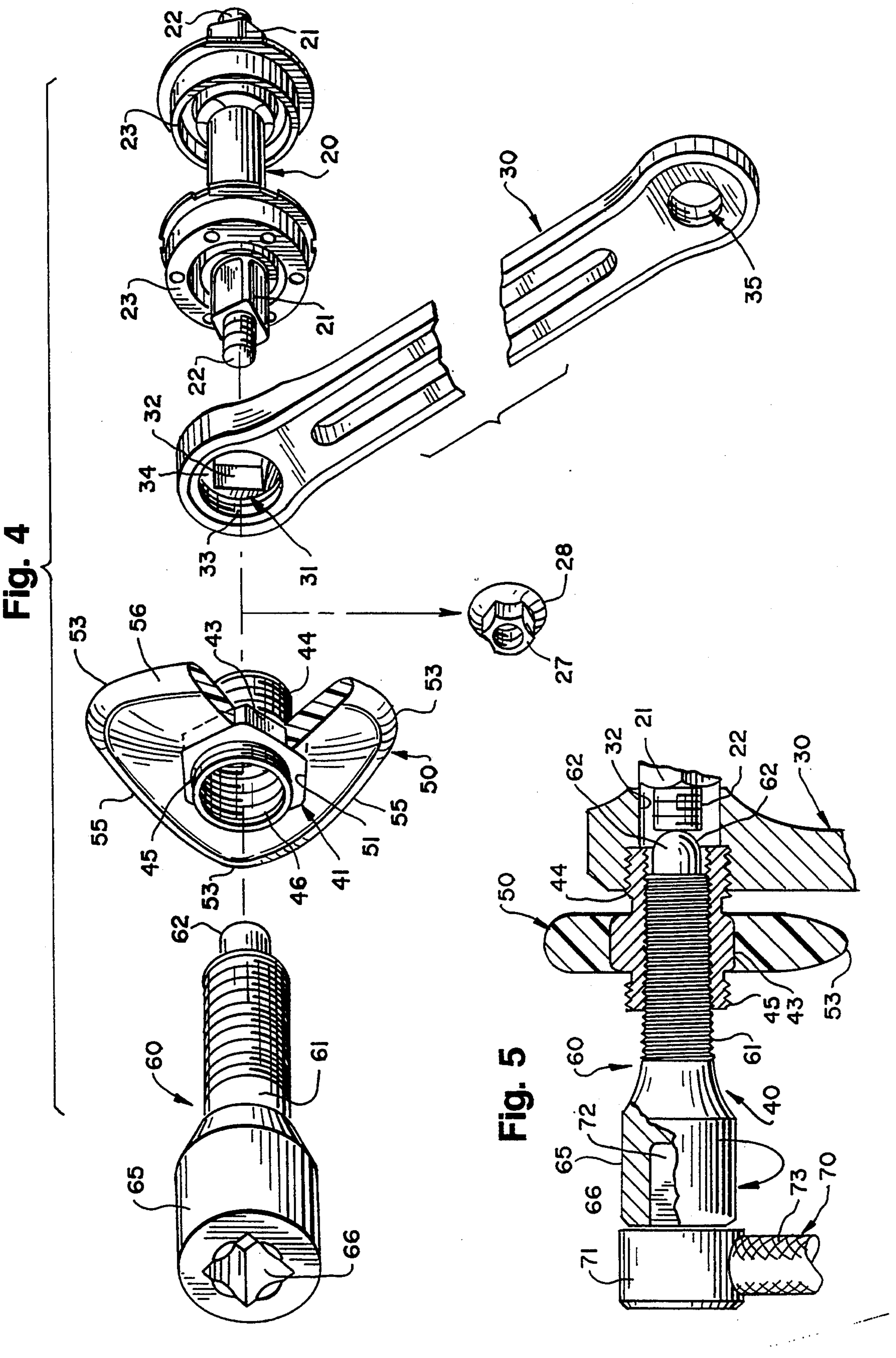
FIG. 4 is an enlarged, exploded, perspective view of a male-ended axle with associated crank arm and the tool of the present invention, with the tool insert handle illustrated in partial section.
FIG. 5 is a view similar to FIG. 2, illustrating the use of the tool of the present invention with the male-ended axle of FIG. 4, and illustrating the application of an associated drive lever.

Referring to FIGS. 2 and 3, in the case of the female type axle 15, the square portion 32 of the crank arm bore 31 is fitted over the square mounting end 16 of the axle 15. The retaining screw 25 is then threadedly engaged in the internally threaded bore 17 of the axle end 16, the flange 26 of the screw 25 engaging the shoulder 34 in the crank arm bore 31 for securing the crank arm 30 in place on the axle end 16. Referring the FIG. 4, the crank arm 30 is mounted on the square mounting end 21 of the male type axle 20 in substantially the same manner, the nut 27 being threadedly engaged with the stud 22 so that the flange 28 engages the shoulder 34 of the crank arm bore 31 securely to hold the crank arm 30 in place.

Because of the substantial torque applied to the crank arms 30 in use, they tend to become wedged very tightly on the axle ends 16 or 21. Thus, removal of the crank arms 30 for servicing, repair or the like may be quite difficult. In accordance with the present invention, there is provided a puller tool 40 to assist in removing a crank arm 30 from the associated axle end 16 or 21. Referring to FIGS. 2–5, the tool 40 includes a cylindrical insert 41 having a tubular body 42 having a hexagonal outer surface portion 43 intermediate its ends. The opposite ends of the tubular body 42 are respectively provided with external threads 44 and 45. The tubular body 42 is also provided with an internal thread 46 extending along its entire length. The external threads 44 and 45 are adapted for threaded engagement with the internally threaded portion 33 of the crank arm bore 31. Two different threads 44 and 45 are provided because crank arms of different manufacture utilize different threads. Thus, for example, one of the threads 44 and 45 may be a 22 mm thread of the type used on crank arms of Italian, English and Japanese manufacture, while the other external thread may be a 23 mm thread of the type used on crank arms of French manufacture.

The insert 41 is provided with a handle 50 which is generally triangular in shape and has a hexagonal bore 51 formed centrally therethrough and adapted for press-fitted or molded engagement over the hexagonal surface portion 43 of the insert 41. The handle 50 has three equiangularly spaced-apart lobes 53 which project radially outwardly from the insert 41, the lobes 53 being joined by slightly convex arcuate sides 55. The thickness of the handle 50 is tapered along its outer peripheral edge, as at 56. The handle 50 is preferably formed of a suitable plastic material. The lobes 53 of the handle 50 project radially outwardly a substantial distance from the axis of the insert 41, this radial distance being substantially greater than (preferably approximately 1.5 times) the acrossflats dimension of the hexagonal surface portion 43 of insert 41. The handle 50 is dimensioned to be comfortably grasped in the hand of a user to facilitate threaded engagement of the insert 41 in the internally threaded portion 33 of the crank arm bore 31.

The tool 40 also includes an elongated pressure screw 60 having an externally threaded shank 61 adapted for threaded engagement with the internal thread 46 of the insert 41. The screw 60 has a bearing end 62 which is generally bullet-shaped, having a distal end which is substantially part-spherical and has a diameter slightly greater than the diameter of the internally threaded bore 17 of the female axle 15. The pressure screw 60 is provided at its opposite end with an enlarged drive end 65 having formed axially therein a drive socket 66 which is preferably substantially square in transverse cross section and is adapted for engagement with an associated lever-type drive tool, e.g., a handle device such as a ratchet wrench, breaker bar or the like, in a known manner. For example, the pressure screw 60 may be used with a drive lever 70 (see FIG. 5) having an enlarged drive head 71 provided with a square drive lug 72 engageable in the socket 66. The drive lever 70 has a handle 73 which may be of any desired length. It will be appreciated that, if desired, the drive lever 70 may be provided with a ratchet drive.

Referring to FIGS. 1–3, in use, when it is desired to remove a crank arm 30 from a female axle end 16, the retaining screw 25 is first removed from the axle end 16 and then the insert 41 is threadedly engaged in the internally threaded portion 33 of the crank arm bore 31, as is indicated in FIG. 2, until the inner end of the insert 41 seats against the shoulder 34 in the crank arm bore 31. In this regard, the handle 50 permits easy manual insertion of the insert 41 into the crank arm bore 31 without the use of auxiliary tools, such as wrenches and the like. After the insert 41 is installed in place, the pressure screw 60 is threadedly engaged through the insert 41 until the bearing end 62 bears against the axle end 16. In this regard, it will be appreciated that the rounded shape of the bearing end 62 will permit it to seat in a self-centering fashion in the internally threaded bore 17 of the axle end 16 without damaging any of the threads. After the pressure screw 60 has been initially threaded into position, a suitable drive lever 70, such as a ratchet wrench, breaker bar, or the like, is engaged in the socket 66 of the pressure screw 60, as illustrated in FIG. 5, and then rotation of the pressure screw 60 is continued in the direction of the arrow in FIG. 2. It will be appreciated that, as the pressure screw 60 travels axially inwardly of the insert 41, the insert 41 pulls the crank arm 30 off of the axle end 16 in known manner. Since the drive lever 70 is removably coupled to the pressure screw 60, a lever of any desired length may be utilized to ensure that adequate torque can be applied to the pressure screw 60 to effect removal of the crank arm 30.

Operation with a male axle 20 is substantially the same. First, the nut 27 is removed and then the tool 40 is installed in place on the crank arm 30 in the same manner as was described above. The operation is the same, except that in this case the bearing end 62 of the pressure screw 60 engages against the flat distal end of the axle stud 22 (see FIG. 5).

From the foregoing, it can be seen that there has been provided an improved crank arm pulling apparatus which is of simple and economical construction, is usable with male or female axle ends without damaging the axle threads, can be simply installed in place on the crank arm without the use of tools and which is, however, adapted for removable attachment of an associated drive lever of any desired length to ensure application of adequate torque for effective removal of the crank arm.

We claim:

1. Apparatus for removing a pedal crank arm from a bicycle axle end, wherein the axle end has an internally threaded axial bore therein and is received in a bore in the crank arm, said apparatus comprising: a tubular insert receivable coaxially in the crank arm bore and adapted to be fixed to the crank arm, an enlarged handle member disposed intermediate the ends of the tubular insert and projecting radially outwardly therefrom to facilitate manual insertion of said tubular insert in the crank arm bore, and a pressure screw receivable coaxially through said insert in threaded engagement therewith, said screw having a convex bearing end and an outer end, said bearing end being substantially part-spherical in shape and having a diameter slightly greater than the diameter of the bore in the axle end and engageable with the axle end, said screw including coupling means on the outer end thereof adapted for removable coupling to an associated drive lever.

2. The apparatus of claim 1, wherein said handle includes three radially-extending lobes.

3. The apparatus of claim 2, wherein said handle is substantially triangular in shape.

4. The apparatus of claim 1, wherein said handle is formed of a plastic material.

5. The apparatus of claim 1, wherein said coupling means includes a square drive socket formed axially in the outer end of said screw.

6. The apparatus of claim 1, wherein said insert is threadedly engaged in the crank arm bore.

7. The apparatus of claim 1, wherein said handle is molded on said insert.

8. The apparatus of claim 7, wherein the opposite ends of the tubular insert are respectively externally threaded with different threads.

* * * * *